United States Patent [19]
Salvia

[11] 3,958,535
[45] May 25, 1976

[54] UNIVERSAL ANIMAL FEED BAG

[76] Inventor: Matthew Salvia, Coldspring Road, Stanfordville, N.Y. 12581

[22] Filed: Oct. 24, 1974

[21] Appl. No.: 517,509

[52] U.S. Cl................................ 119/72.5; 119/18; 119/71
[51] Int. Cl.²......................................... A01K 7/00
[58] Field of Search...................... 119/72.5, 71, 18

[56] References Cited
UNITED STATES PATENTS

| | | | |
|---|---|---|---|
| 2,697,531 | 12/1954 | Hood | 119/71 UX |
| 2,708,421 | 5/1955 | Jauch | 119/71 |
| 3,228,377 | 1/1966 | Grassano | 119/72.5 |

Primary Examiner—Hugh R. Chamblee

[57] ABSTRACT

A universal disposable water bag for supplying bacteria-free water and/or premedicated water to laboratory animals comprises a generally rectangular plastic bag having a plastic demand feeding valve located on a wide face near one end of the bag so that when it is positioned in a holder the valve may feed vertically, horizontally or at an inclination. The demand feeding valve also has means for piercing the bag just prior to positioning it for use. The holder is constructed to shield the bag from the claws of the animals and has hooks to secure it to the cage.

1 Claim, 8 Drawing Figures

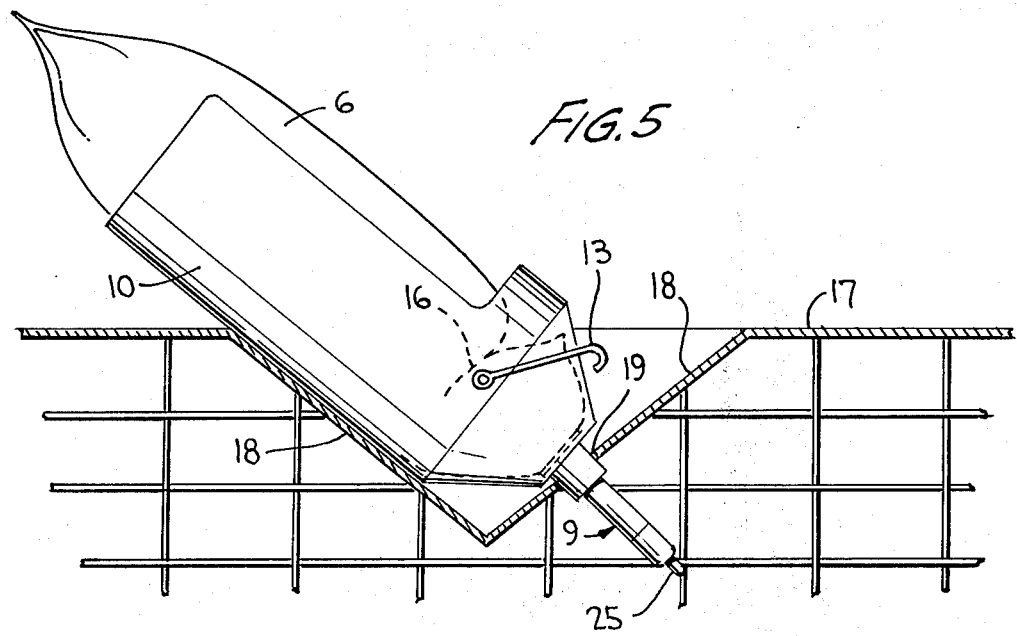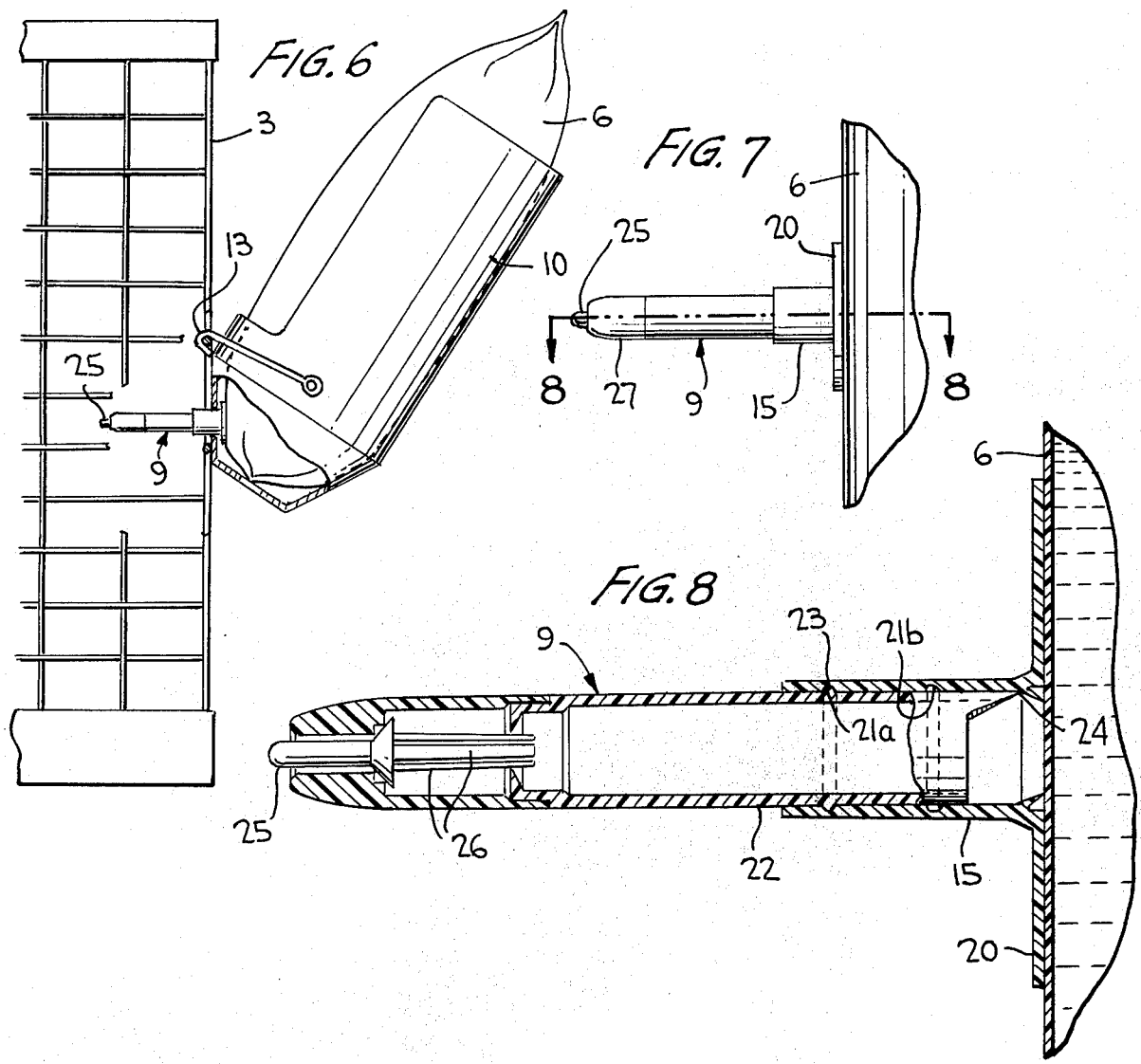

UNIVERSAL ANIMAL FEED BAG

BACKGROUND OF THE INVENTION

The present invention relates to a bag for feeding water to animals in research laboratories. In controlled scientific experiments using small animals such as rodents, research laboratories have many thousands of cages in which the animals are housed. Essential in the care of such animals is the availability of water at all times. Any harmful bacteria either in the water or at the feeding mechanism could induce sickness in the rodent which, during a research experiment, could invalidate the experiment. In the prior art, to achieve sterility, the presently used water bottles and feeding tubes are sanitized and refilled two or three times weekly. This involves removing the bottles from the cage rooms, sanitizing the bottles and component parts filling the bottles with water and transporting them back to the cage rooms.

Accordingly, it is the primary object of this invention to provide a disposable plastic bag for feeding water upon demand to laboratory animals which will eliminate the costly, time consuming sanitizing procedures now employed and thereby simplify the water feeding.

Another object of this invention is to maintain a constant sterility in the water feeding of laboratory animals.

A further object is to arrange the demand feeding valve on the bag so that when it is located in the holder designed for it, the valve may be positioned to extend into either the top or the side of the animal cage.

A still further object of this invention is to provide a demand feeding valve with means for piercing the bag so as to maintain the sterile condition of its contents until use.

Yet another ojbect of this invention is to provide a holder for the plastic bag which will protect it from the claws of the animals feeding from it.

BRIEF DESCRIPTION OF THE DRAWINGS

These and other objects and advantages of the invention will subsequently become apparent from the following detailed description and discussion of the prior art when read in conjunction with the accompanying drawings wherein:

FIG. 5 is a side view of the bag on another form of holder incorporated in the top of a cage;

FIG. 6 is a side view of the bag in the holder of FIG. 4 mounted on the side of a cage;

FIG. 7 is a side view of the demand feeding valve attached to a portion of the bag;

FIG. 8 is an enlarged sectional view of the valve taken along line 8 — 8 of FIG. 7;

DETAILED DESCRIPTION OF THE INVENTION AND DRAWINGS

Figure 1:
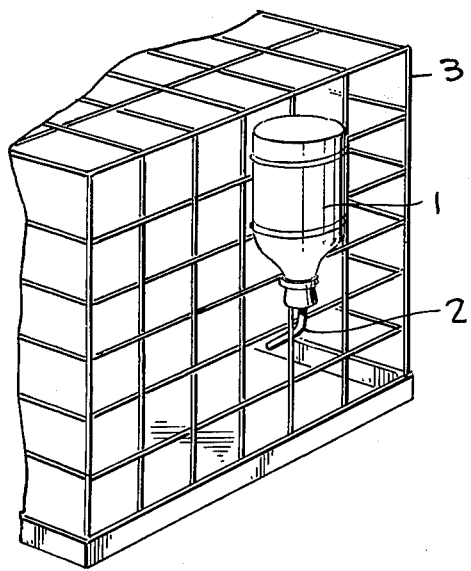
FIG. 1 is a view of an animal cage with a watering bottle used in the prior art.

Referring now more specifically to the drawings, FIG. 1 shows a prior art system of feeding water to laboratory animals by means of a glass bottle 1 having a stainless steel sipper feeding tube 2. The bottle is secured to the outside of a cage 3 with the tube entering the cage as shown. Generally, the cages may contain one to four rodents. The bottles are changed an average of two and one-half times a week. Since as previously noted, many thousands of cages are involved, a considerable investment in equipment and time is needed to service the animals with fresh water. The bottles are collected in racks, placed on conveyors and passed through a heated washing system and ultimately refilled with tap water at a filling manifold. The bottles are subject to breakage and must be replaced. Aside from the costliness of this procedure, the use of tap water may contain, as previously noted, harmful bacteria. The preferred and intended use of the bag of this invention is that it be filled with bacteria-free spring water.

Figure 2:
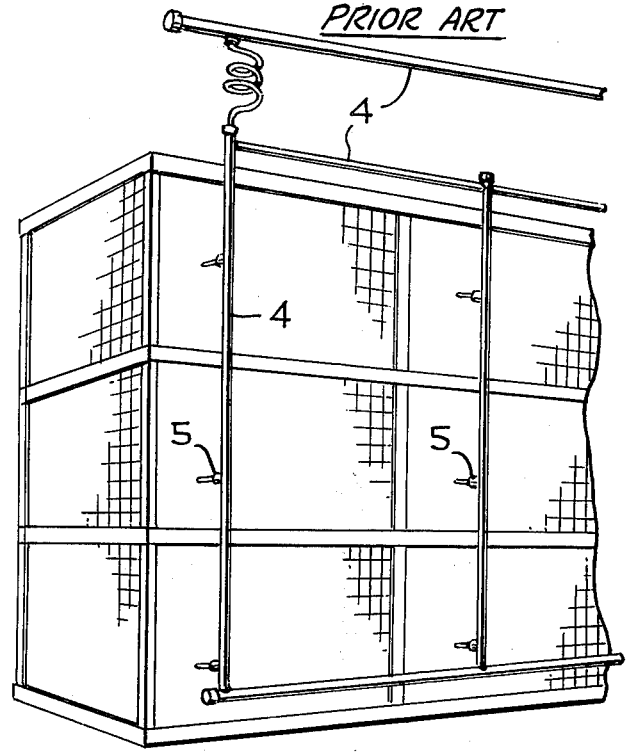
FIG. 2 is a view of animal cages and a fixed piping and feeding valve system of the prior art.

FIG. 2 shows another prior art system for watering animals in which a permanent system of piping 4 is installed having spring loaded lever valves 5 extended into each cage. The disadvantages of this system are that, as before, when untreated water is used, the valves from prolonged usage may become contaminated with bacteria. If a valve should become clogged, the animal could become dehydrated in a short period of time from lack of water before the defect in the valve would become known.

Figure 3:
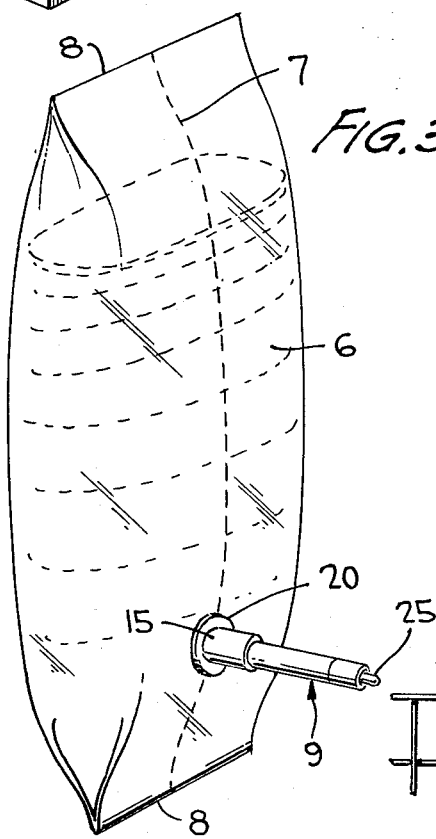
FIG. 3 is a perspective view of a filled bag of the invention.

Turning now to the bag of this invention, FIG. 3 shows a plastic bag 6 filled with water but which is generally rectangular and flat when empty. The bag which is made from plastic sheeting has a single heat sealed seam longitudinally at 7 and is also heat sealed when filled at both ends 8. A demand feeding valve 9 made of a hard moldable plastic such as polyethylene is heat sealed to one rectangular face of the bag approximately two inches from an end.

Figure 4:
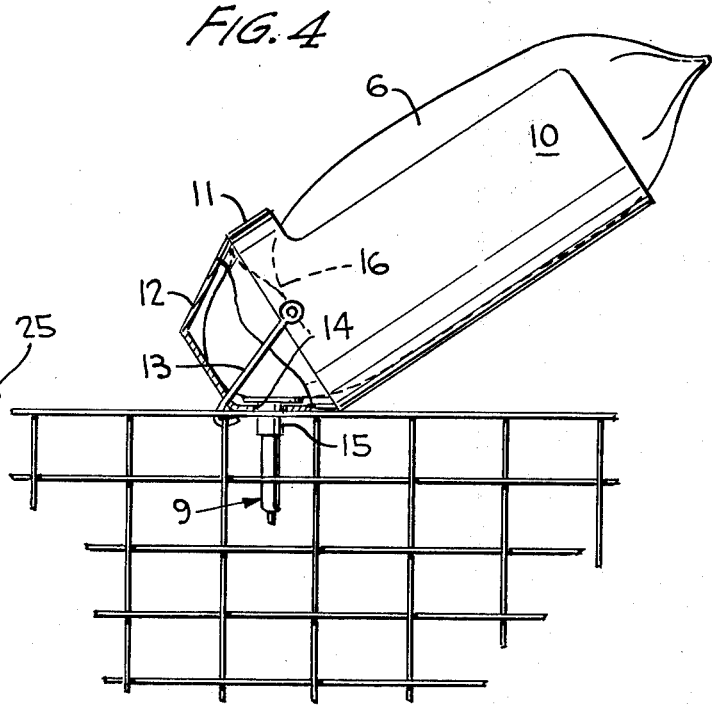
FIG. 4 is a side view of the filled bag mounted in one form of a holder on top of a cage.

One form of holder for the bag shown in FIG. 4 wherein the upper portion 10 is semicircular while the lower portion 11 is tubular and has a truncated conical portion 12. The holer is designed to shield the bag from being ruptured by the claws of rodents. To secure the holder to a cage, protruding hooks 13 will clip on to the horizontal bars of the cage. A hole 14 in the conical portion 12 permits entry and secures by friction a fitment portion 15 of the valve 9.

Some animals may prefer to drink by activating a valve depending from the top of a cage as shown in FIG. 4. It is to be noted that the flexible nature of the bag allows it to be folded as at 16 so that the valve may be positioned through the lower hole 14. For small animals and the lower cages of a stack, the holder may be attached to the side of a cage as shown in FIG. 6. In FIG. 5 is shown a top 17 for a cage, having inclined portions 18 with an opening 19 whereby the holder 10 can be positioned for the bag to feed at an inclination. Because of the manner in which the valve is located and the flexibility of the bag, the latter is adapted when placed in the holder 10 to feed from either the top or the side of a cage. It is in this sense that the term, universal, is used in the title of the invention.

Details of demand feeding valve 9 are shown in FIG. 8. The fitment 15, having a flange portion 20 which may be heat sealed to the bag 6, has two detents 21 $a$ and $b$. The valve has a head portion 22 having a boss 23 which before use is engaged in detent 21 $a$. The head portion terminates in a bayonet or piercing point 24. Just prior to use, pushing the body of the valve approximately one-half inch will advance boss 23 to detent 21

*b* in the fitment and cause the bayonet 24 to pierce the plastic bag, allowing the water to flow to the valve. The boss and detent constitute a force-fit means. At the other end of the body portion 27 of valve 9 is the feeding valve element 25 which has three rearwardly extending reeds 26 acting as a spring to control the feeding of water through the valve. The tension of the spring-like action of the reeds 26 is such that a very light pressure by an animal in its drinking action will release the water. All parts of the foregoing feeding valve are made of plastic such as the previously noted polyethylene.

The use and advantages are apparent from the foregoing description. Upon exhaustion of the contents, the bag may be readily crushed into a small volume for disposal. A plastic cap may obviously be secured about the valve parts to maintain its sterility before use. The intended use of the bag with spring water whereby sterile conditions are maintained before and during use are distinctly advantageous in protecting the life of laboratory animals as compared to the use of tap water and other contaminating conditions in the prior art. In addition, economy in time and equipment as required by the prior art of FIG. 1 will accrue. While various changes may be made in the detail construction, it is understood that such changes will be within the spirit and scope of the present invention.

I claim:

1. A universal disposable water bag for feeding laboratory animals comprising a generally rectangular, flat bag of plastic sheeting adapted to be heat sealed and enclose a quantity of sterile water, having a demand feeding valve made of hard moldable plastic, heat sealed to a flat face of said bag, said valve comprising a fitment with two longitudinally spaced detents and a flange portion that is heat sealed to the bag, a valve body having a boss normally engaging the detent farthest from the flange, a piercing means at the end within said fitment and a demand feeding valve with a spring reed control means at the other end whereby pushing the valve body towards the flange to engage the other detent will pierce the bag and release the sterile water for feeding the animals.

* * * * *